US009886805B1

(12) United States Patent
Bianchi, III et al.

(10) Patent No.: US 9,886,805 B1
(45) Date of Patent: Feb. 6, 2018

(54) PRIMING VEHICLE ACCESS BASED ON WIRELESS KEY VELOCITY

(71) Applicant: Ford Global Technologies, LLC, Dearborn, MI (US)

(72) Inventors: Arthur Thomas Bianchi, III, Sterling Heights, MI (US); Kevin F. Militello, South Lyon, MI (US); John Robert Van Wiemeersch, Novi, MI (US); Vivekanandh Elangovan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/372,376

(22) Filed: Dec. 7, 2016

(51) Int. Cl.
*G05B 19/00* (2006.01)
*G07C 9/00* (2006.01)

(52) U.S. Cl.
CPC ..... *G07C 9/00309* (2013.01); *G07C 9/00896* (2013.01); *G07C 2009/00769* (2013.01)

(58) Field of Classification Search
CPC ........................ G07C 2209/63; G07C 9/00309
USPC ........................................ 340/5.6, 5.61, 5.63
See application file for complete search history.

(56) References Cited

U.S. PATENT DOCUMENTS

| | | | | |
|---|---|---|---|---|
| 7,084,734 | B2 | 8/2006 | Singh | |
| 7,446,644 | B2 | 11/2008 | Schaffzin et al. | |
| 8,045,961 | B2 | 10/2011 | Ayed et al. | |
| 8,053,922 | B2 | 11/2011 | Muller | |
| 8,811,900 | B2 | 8/2014 | Kirsch et al. | |
| 9,008,917 | B2 | 4/2015 | Gautama et al. | |
| 9,168,927 | B2 * | 10/2015 | Louboutin | H04W 4/021 |
| 2009/0153294 | A1 * | 6/2009 | Katagiri | B60R 25/246 340/5.61 |
| 2010/0052931 | A1 * | 3/2010 | Kolpasky | B60R 25/00 340/670 |
| 2010/0304690 | A1 * | 12/2010 | Proefke | B60R 25/403 455/69 |
| 2014/0049361 | A1 * | 2/2014 | Ahearn | G07C 9/00309 340/5.7 |
| 2014/0253288 | A1 | 9/2014 | O'Brien et al. | |
| 2014/0274223 | A1 | 9/2014 | Kleve et al. | |
| 2015/0028995 | A1 * | 1/2015 | Gautama | B60R 25/406 340/5.72 |
| 2015/0161834 | A1 * | 6/2015 | Spahl | G07C 9/00111 340/5.61 |
| 2015/0258962 | A1 * | 9/2015 | Khanu | B60R 25/2054 701/49 |
| 2015/0291126 | A1 | 10/2015 | Nicholls et al. | |
| 2016/0063786 | A1 | 3/2016 | Lewis et al. | |
| 2016/0217676 | A1 * | 7/2016 | Kurtovic | G08B 21/24 |
| 2016/0358397 | A1 * | 12/2016 | Kristensen | G07C 9/00309 |

* cited by examiner

*Primary Examiner* — Carlos E Garcia
(74) *Attorney, Agent, or Firm* — James P. Muraff; Neal, Gerber & Eisenberg LLP

(57) ABSTRACT

Method and apparatus are disclosed for priming vehicle access based on wireless key velocity. An example vehicle includes a communication module to receive a signal from a wireless key of a user that includes velocity data of the wireless key and determine a distance to the wireless key. The example vehicle also includes a vehicle primer to determine an arrival time of the user based on the velocity data and the distance and prime the vehicle for access before the arrival time.

20 Claims, 4 Drawing Sheets

PRIMING VEHICLE ACCESS BASED ON WIRELESS KEY VELOCITY

CROSS REFERENCE TO RELATED APPLICATION

This application is related to U.S. application Ser. No. 15/372,369, filed on Dec. 7, 2016, which is incorporated herein by reference in its entirety.

TECHNICAL FIELD

The present disclosure generally relates to wireless keys and, more specifically, priming vehicle access based on wireless key velocity.

BACKGROUND

Oftentimes, vehicles utilize remote keyless entry systems to enable a user (e.g., a driver) to unlock and/or open a door without inserting a key into a lock. Some remote keyless entry systems include a key fob that is carried by the user. The key fob has a wireless transducer that communicates with a vehicle to initiate the unlocking and/or opening of the door. Other remote keyless entry systems utilize an application operating on a mobile device (e.g., a smart phone) that communicates with the vehicle to unlock and/or open the door.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for priming vehicle access based on wireless key velocity. An example disclosed vehicle includes a communication module to receive a signal from a wireless key of a user that includes velocity data of the wireless key and determine a distance to the wireless key. The example disclosed vehicle also includes a vehicle primer to determine an arrival time of the user based on the velocity data and the distance and prime the vehicle for access before the arrival time.

An example disclosed method for priming vehicle access includes receiving, via a vehicle communication module, a signal from a wireless key of a user that includes velocity data of the wireless key and determining, via a processor, a distance between a vehicle and the wireless key. The example disclosed method also includes determining an arrival time of the user based on the velocity data and the distance and priming the vehicle for access before the arrival time.

An example disclosed system for priming vehicle access includes a wireless key of a user to determine velocity data of the wireless key and transmit the velocity data upon collecting a low-energy beacon. The example disclosed system also includes a vehicle to receive the velocity data from the wireless key, determine an arrival time of the user based on the velocity data and a signal strength of the signal, and prime the vehicle for access before the arrival time.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
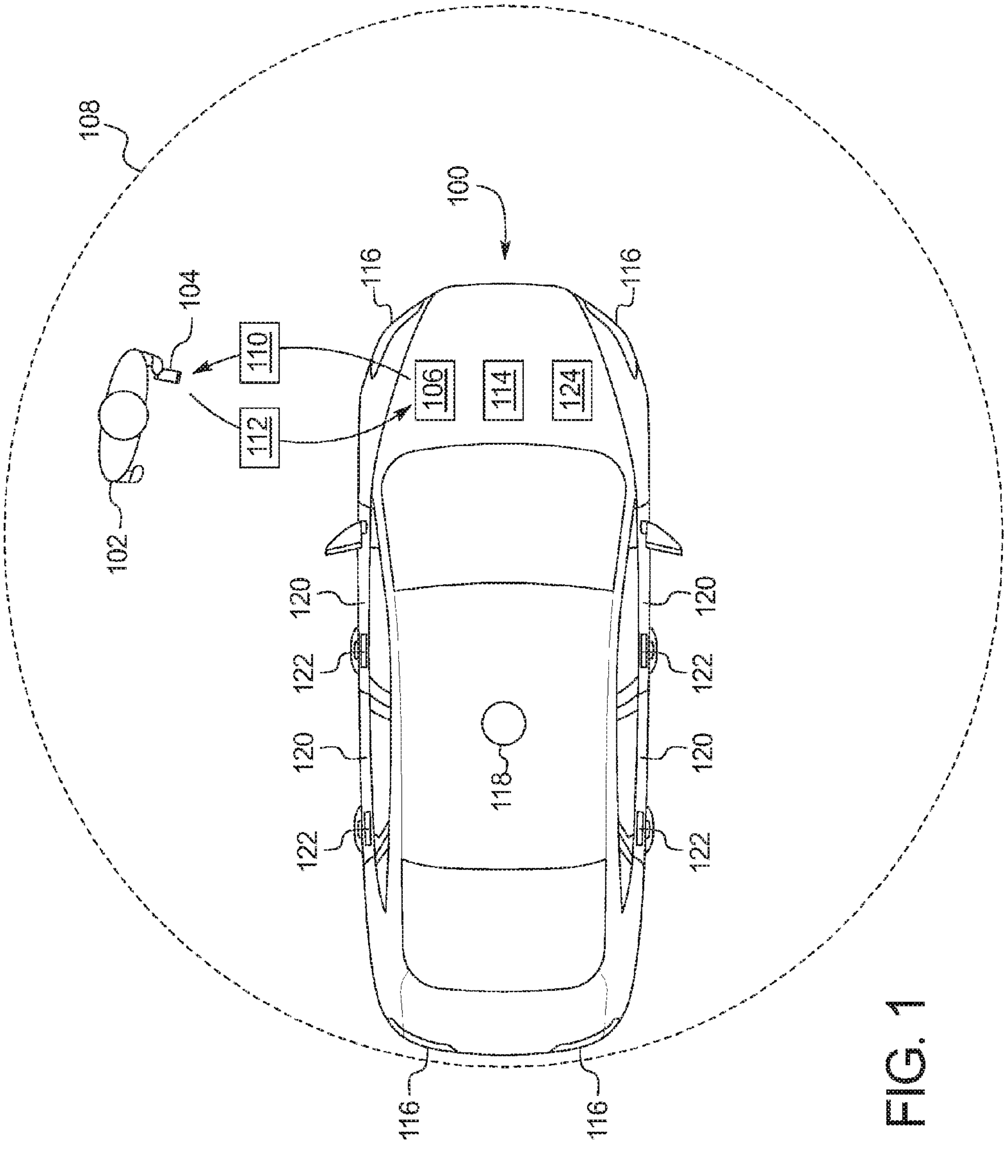
FIG. 1 illustrates an example vehicle and an example wireless key in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote keyless entry systems oftentimes are utilized by a vehicle to enable a user (e.g., a driver) to unlock and/or open a door of the vehicle without inserting a key into a lock of the vehicle. In some instances, a remote keyless entry system includes a key fob that is carried by the user. The key fob includes a wireless transducer that communicates with the vehicle to initiate the unlocking and/or opening of the vehicle door. In other instances, a remote keyless entry system utilizes an application operating on a mobile device (e.g., a smart phone) that communicates with the vehicle to unlock and/or open the door. The key fob and/or the mobile device application may include a button that the user presses to initiate communication to the vehicle (e.g., to instruct the vehicle to unlock the door). Some remote key entry systems include a passive entry system in which the vehicle unlocks a door upon detecting that a corresponding key fob and/or mobile device is within a proximity of the vehicle. In some instances, a user carrying the key fob and/or mobile device may potentially arrive at the vehicle before the passive entry system is able to unlock the door.

Examples disclosed herein include a vehicle that collects velocity data of a wireless key (e.g., a key fob, a mobile device, etc.), determines an expected arrival time of a user carrying the wireless key based on the velocity data, and primes the vehicle for entry by the user before the expected arrival time. As used herein, "priming a vehicle," "priming a vehicle for access," and "priming a vehicle for entry" refer to initiating one or more systems and/or devices of the vehicle that facilitate entry of the vehicle by the user. For example, priming the vehicle includes activating lights (e.g., interior lights, exterior lights) of the vehicle, unlocking one or more doors, and/or priming one or more doors of the vehicle. As used herein, "priming a door" refers to instructing an electronic latch to unlock a corresponding door upon detection that a user has attempted to open a door (e.g., by touching a handle of the door).

An example system disclosed herein includes a vehicle and a wireless key of a user (e.g., a driver or a passenger). As used herein, a "wireless key" refers to a device that communicates with an object (e.g., a vehicle) to activate functions of the object (e.g., to trigger an alarm, to prime a vehicle, to remote start an engine of a vehicle, etc.) from a remote location away from the object. Wireless keys include key fobs and/or applications of mobile devices (e.g., smart phones, tablets, smart watches, etc.). The vehicle of the example system includes a communication module (e.g., a short range wireless module) that broadcasts a beacon (e.g., a low-energy beacon such as Bluetooth® low-energy (BLE) beacon). As used herein, a "beacon" is a signal that is intermittently broadcasted by a source.

The wireless key of the example system collects or obtains the broadcasted beacon when the wireless key is within a proximity range of the vehicle (e.g., a broadcast range of the beacon). The beacon prompts the wireless key to transmit a signal that includes velocity data (e.g., a speed and a direction of travel) and/or orientation data (e.g., magnetic orientation) of the wireless key to the vehicle. For example, the wireless key includes an accelerometer and/or another meter to determine the speed of the wireless key. In other examples, a global positioning system (GPS) and/or assisted GPS is utilized to determine the velocity of the wireless key. Additionally or alternatively, the wireless key includes a magnetometer and/or another meter to determine the direction of travel and/or a magnetic orientation of the wireless key.

The communication module of the vehicle receives the signal from the wireless key and determines a distance between the vehicle and the wireless key based on a signal strength of the signal (e.g., via a received signal strength indicator). The vehicle of the example system also includes a vehicle primer that determines an arrival time of the user at the vehicle based on the velocity data of the wireless key, the orientation data of the wireless key and/or the distance between the wireless key and the vehicle. As used herein, an "arrival time" is an estimated time (e.g., 11:47:59 P.M.) at which and/or an estimated time duration (e.g., 12 seconds) until a wireless key of a user arrives at a vehicle. Further, the vehicle primes the vehicle for access by the user before the determined arrival time.

In some examples, the vehicle primer determines a point-of-arrival at which the user is predicted to arrive at the vehicle. For example, based on the velocity data of the wireless key and an orientation (e.g., magnetic orientation) of the vehicle, the vehicle primer may predict the point-of-arrival of the user at the vehicle. The vehicle may include a GPS receiver and/or a magnetometer to determine the orientation of the vehicle. In some examples, the vehicle primer primes the vehicle based on the point-of-arrival. The vehicle primer may prime a door that is nearest to the point-of-arrival to unlock and may keeps other doors of the vehicle farther away from the point-of-arrival unprimed for unlocking. For example, if the vehicle primer predicts that the user is approaching a front, passenger-side door of a vehicle, the vehicle primer primes only that door of the vehicle for unlocking.

Turning to the figures. FIG. 1 illustrates an example vehicle 100 and a user 102 carrying an example wireless key 104 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes a communication module 106 that is to communicatively couple to the wireless key 104. In the illustrated example, the communication module 106 is a short-range wireless module that includes a wireless transducer to wirelessly communicate with the wireless key 104 and/or another device that is within a broadcast range or distance of the communication module 106. The short-range wireless module includes hardware and firmware to establish a connection with the wireless key 104. In some examples, the short-range wireless module implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In the illustrated example, the vehicle 100 includes one communication module (e.g., the communication module 106). In other examples, the vehicle 100 includes a plurality of communication modules that are to communication with the wireless key 104 and are positioned at different locations throughout the vehicle 100.

As illustrated in FIG. 1, the broadcast range of the communication module 106 defines a proximity range 108 of the vehicle 100 in which the communication module 106 is capable of communicating with the wireless key 104 and/or another device. For example, when the wireless key 104 is within the proximity range 108 of the vehicle 100, the wireless key 104 is able to collect a beacon 110 (e.g., a low-energy beacon such as Bluetooth® low-energy (BLE) beacon) that is broadcasted intermittently by the communication module 106. In some examples, the beacon 110 is broadcasted by the communication module 106 at a constant rate (e.g., one broadcast per second). In other examples, a rate at which the communication module 106 broadcasts the beacon 110 is dependent upon a distance between the communication module 106 and the wireless key 104. For example, the communication module 106 may broadcast the beacon 110 at a greater rate the closer the wireless key 104 is to the vehicle 100.

Further, when the wireless key 104 is within the proximity range 108, the communication module 106 is able to receive a signal 112 (e.g., via Bluetooth® and/or BLE protocols) that is transmitted by the wireless key 104. For example, the signal 112 received by the communication module 106 of the vehicle 100 may include velocity data (e.g., including a speed and a direction of travel), orientation data and/or other data of the wireless key 104. In some examples, the vehicle 100 identifies the direction at which the wireless key 104 is approaching the vehicle 100 via Bluetooth® Angle of Arrival. Additionally, the communication module 106 determines a distance between the vehicle 100 and the wireless key 104. For example, the communication module 106 determines the distance to the wireless key 104 based on a signal strength of the received signal 112. In some such examples, the communication module 106 utilizes a received signal strength indicator (RSSI) corresponding to the received signal 112 to determine the distance to the wireless key 104.

The vehicle 100 of the illustrated example includes a global positioning sensor (GPS) receiver 114, exterior lights 116, and interior lights 118. The GPS receiver 114 determines and/or obtains a position and/or orientation (e.g., magnetic orientation) of the vehicle 100. In the illustrated example, the exterior lights 116 includes headlamps and tail lights, and the interior lights 118 include an overhead light.

The vehicle 100 also includes doors 120 that enable the user 102 to access and/or enter an interior of the vehicle 100. In the illustrated example, the vehicle 100 is a four-door vehicle such that the doors 120 include a front, driver-side door; a front passenger-side door; a back, driver-side door; and a back, passenger-side door. In other examples, the vehicle 100 may include more or less doors through which the user 102 may access and/or enter the interior of the vehicle 100. The vehicle 100 also includes electronic latches 122 that prime, lock, and/or unlock the doors 120. In the illustrated example, each of the electronic latches 122 controls a respective one of the doors 120. In some examples, each of the electronic latches 122 is communicatively coupled to a sensor (e.g., a capacitive touch sensor, an infrared sensor, an angular rotation sensor, etc.) of the corresponding door 120 to detect when the user 102 is attempting to open the door 120. In the illustrated example, each of the electronic latches 122 is communicatively coupled to a vehicle primer 124 that may send a signal to one or more of the electronic latches 122 to unlock, lock, and/or prime the corresponding one or more of the doors 120.

The vehicle primer 124 also is communicatively coupled to communication module 106 and/or the GPS receiver 114 of the vehicle 100. In operation, the vehicle primer 124 collects the data of the wireless key 104 (e.g., the velocity data, the orientation data) that is received by the communication module 106 of the vehicle 100. In some examples, the vehicle primer 124 utilizes sensor fusion (e.g., executes a sensor fusion algorithm) to combine and/or reduce uncertainty associated with the data received from the wireless key 104. Additionally, the vehicle primer 124 obtains the distance between the vehicle 100 and the wireless key 104 that is determined, for example, by the communication module 106 based on the RSSI of the signal 112 received from the wireless key 104. Alternatively, the vehicle primer 124 may determine the distance between the vehicle 100 and the wireless key 104 based on data collected by the vehicle 100 and/or the wireless key 104.

Further, the vehicle primer 124 of the illustrated example collects data associated with the vehicle 100. For example, the vehicle primer 124 collects position and/or orientation (e.g., magnetic orientation) data of the vehicle 100 from the GPS receiver 114 and/or sensor(s) (e.g., sensors 304 of FIG. 3) of the vehicle 100. In some examples, the GPS receiver 114 collects position and/or orientation data of the vehicle 100 that is/are determined utilizing satellite-based GPS and/or terrestrial-based Assisted GPS.

Based on the collected data, the vehicle primer 124 determines an arrival time of the user 102 at the vehicle 100. For example, the vehicle primer 124 may determine a time (e.g., 7:22:51 P.M.) at which the user 102 is estimated to arrive at the vehicle 100. and/or an estimated time duration (e.g., 4.5 seconds) until the user 102 is estimated to arrive at the vehicle 100. Additionally, the vehicle primer 124 primes the vehicle 100 (e.g., activates the external lighting 116 and/or the internal lighting 118, primes and/or unlocks one or more of the doors 120, etc.) before the arrival time to enable the user 102 to access the interior of the vehicle 100 upon reaching the vehicle 100.

By priming the vehicle 100 based on velocity, orientation and/or other data received from the wireless key 104, the vehicle primer 124 is capable of priming the vehicle 100 before a user (e.g., the user 102) who is moving quickly toward the vehicle 100 arrives at the vehicle 100. For example, if the user 102 is moving quickly toward the vehicle 100, the vehicle primer 124 may determine to prime the vehicle 100 before the communication module 106 broadcasts another beacon to ensure that the vehicle 100 is primed before the user 102 arrives at the vehicle 100. Alternatively, if the user 102 is moving slowly toward the vehicle 100, the vehicle primer 124 may determine to wait, broadcast another beacon, and receive additional corresponding velocity data from the wireless key 104 before determining whether and/or when to prime the vehicle 100.

Additionally, the vehicle primer 124 may determine a point-of-arrival at which the vehicle primer 124 predicts that the user 102 is to arrive at the vehicle 100. For example, the vehicle primer 124 determines the point-of-arrival based on the velocity data of the wireless key 104 and/or the orientation data of the vehicle 100. Further, the vehicle primer 124 may adjust or tailor how the vehicle 100 is primed based on the point-of-arrival. For example, if the determined point-of-arrival of the user 102 is near one of the doors 120 (e.g., the front, driver-side door) of the vehicle 100, the vehicle primer 124 may unlock and/or prime the door 120 nearest the point-of-arrival and keep the other of the doors 120 farther away from the point-of-arrival (e.g., the front, passenger-side door; the back, driver-side door; the back, passenger-side door) locked and/or unprimed.

Figure 2:
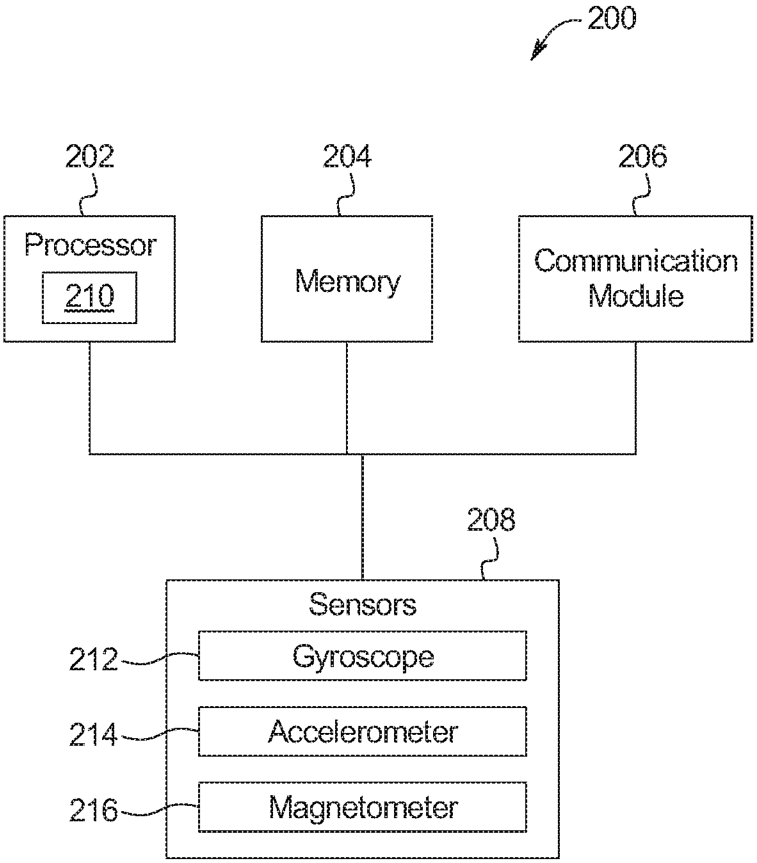
FIG. 2 is a block diagram of electronic components of the wireless key of FIG. 1.

FIG. 2 is a block diagram of electronic components 200 of the wireless key 104. As illustrated in FIG. 2, the electronic components 200 include a microcontroller unit, controller, or processor 202. Further, the electronic components 200 include memory 204, a communication module 206, and sensors 208.

In the illustrated example, the processor 202 is structured to include a characteristic determiner 210. The processor 202 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 204 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 204 includes multiple kinds of memory, particularly volatile memory and non-volatile memory.

The memory 204 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 204, the computer readable medium, and/or within the processor 202 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The communication module 206 of the electronic components 200 of the wireless key 104 is to communicatively couple to the communication module 106 of the vehicle 100. The communication module 206 of the illustrated example includes a short-range wireless module having a wireless transducer to communicate with the communication module 106 when the vehicle 100 is within a proximity range of distance of the wireless key 104. The short-range wireless module includes hardware and firmware to establish a connection with the communication module 106 of the vehicle 100. In some examples, the short-range wireless module implements the Bluetooth® and/or Bluetooth® Low Energy (BLE) protocols.

The sensors 208 monitor properties or characteristics related to the wireless key 104 and/or a device on which the wireless key 104 is installed. In examples in which the wireless key 104 is a key fob, the sensors 208 are located within the key fob and monitor properties or characteristics of the key fob and/or an environment in which the key fob is located. In examples in which the wireless key 104 is an application of a mobile device, the sensors are located within the mobile device and monitor properties or characteristics of the mobile device and/or an environment in which the mobile device is located. In the illustrated example, the sensors 208 include a gyroscope 212, an accelerometer 214, and a magnetometer 216. For example, the accelerometer 214 measures a velocity at which the wireless key 104 is moving. The gyroscope 212 and/or the magnetometer 216 measures a magnetic orientation of the wireless key 104 and/or a direction in which the wireless key 104 is moving. In other examples, satellite-based GPS and/or terrestrial-based Assisted GPS is utilized to determine the location, the orientation, and/or the velocity of the wireless key 104.

In operation, the characteristic determiner 210 of the processor determines velocity data, orientation data, and/or other data of the wireless key 104 based on data collected by the gyroscope 212, the accelerometer 214, the magnetometer, and/or any other of the sensors 208 of the wireless key 104. In some examples, the characteristic determiner 210 utilizes sensor fusion (e.g., executes a sensor fusion algorithm) in which data collected from a plurality of the sensors 208 is combined to reduce uncertainty associated with the data collected from the sensors 208. Further, the communication module 206 collects the beacon 110 broadcasted by the communication module 106 when the wireless key 104 is located within the proximity range 108 of the vehicle 100. Additionally or alternatively, the communication module 206 includes a GPS receiver to determine a velocity and/or orientation of the wireless key 104 via GPS and/or a cellular communication transceiver to determine a velocity and/or orientation of the wireless key 104 via Assisted GPS. Upon collecting the beacon 110, the communication module 206 of the wireless key 104 generates the signal 112 to include the velocity data, orientation data, and/or other data of the wireless key 104 and transmits or sends the signal 112 to the communication module 106 of the vehicle 100.

Figure 3:
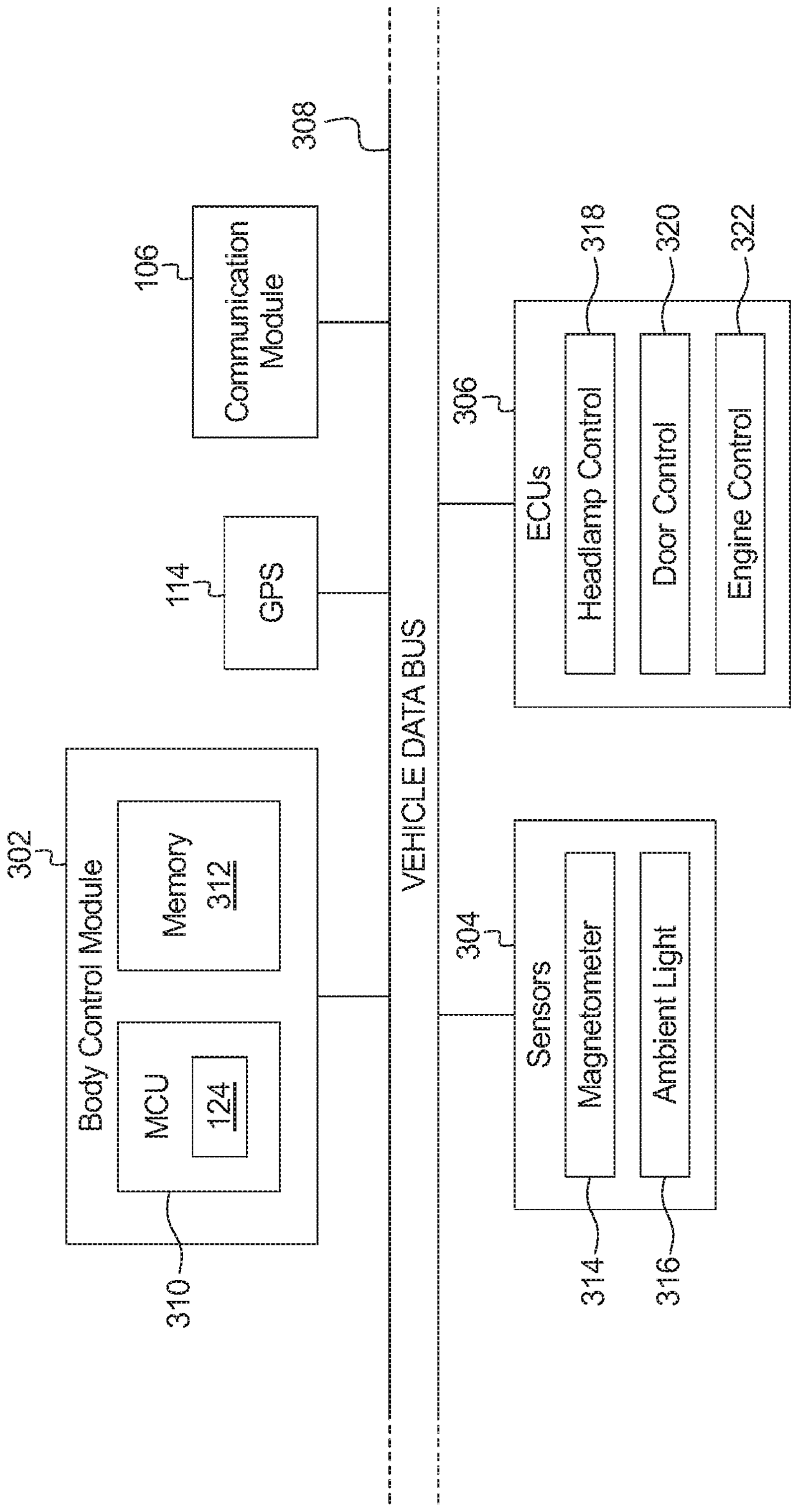
FIG. 3 is a block diagram of electronic components of the vehicle of FIG. 1.

FIG. 3 is a block diagram of electronic components 300 of the vehicle 100. As illustrated in FIG. 3, the electronic components 300 include a body control module 302, the GPS receiver 114, the communication module 106, sensors 304, electronic control units (ECUs) 306, and a vehicle data bus 308.

The body control module 302 controls one or more subsystems throughout the vehicle 100, such as external lighting, power windows, an immobilizer system, power mirrors, etc. For example, the body control module 302 includes circuits that drive one or more of relays (e.g., to control wiper fluid, etc.), brushed direct current (DC) motors (e.g., to control power seats, power windows, wipers, etc.), stepper motors, LEDs, etc.

The body control module includes a microcontroller unit, controller or processor 310 and memory 312. In some examples, the body control module 302 is structured to include vehicle primer 124. Alternatively, in some examples, the vehicle primer 124 is incorporated into another electronic control unit (ECU) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include a magnetometer 314 and an ambient light sensor 316. For example, the magnetometer 314 may determine an orientation (e.g., magnetic orientation) of the vehicle 100. Additionally or alternatively, the ambient light sensor 316 may measure an amount of ambient light around the vehicle 100 to enable the body control module 302 to adjust a brightness of the exterior lights 116 and/or the interior lights 118 based on the amount of ambient light.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have seventy or more of the ECUs 306 that are positioned in various locations around the vehicle 100 and are communicatively coupled by the vehicle data bus 308. In the illustrated example, the ECUs 306 include a headlamp control unit 318, a door control unit 320, and an engine control unit 322. For example, the headlamp control unit 318 operates the exterior lights 116 of the vehicle 100, the door control unit 320 operates (e.g., locks, unlocks, primes) of power locks of the doors 120 of the vehicle 100, and the engine control unit 322 controls remote starting of an engine of the vehicle 100.

The vehicle data bus 308 communicatively couples the communication module 106, the GPS receiver 114, the body control module 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
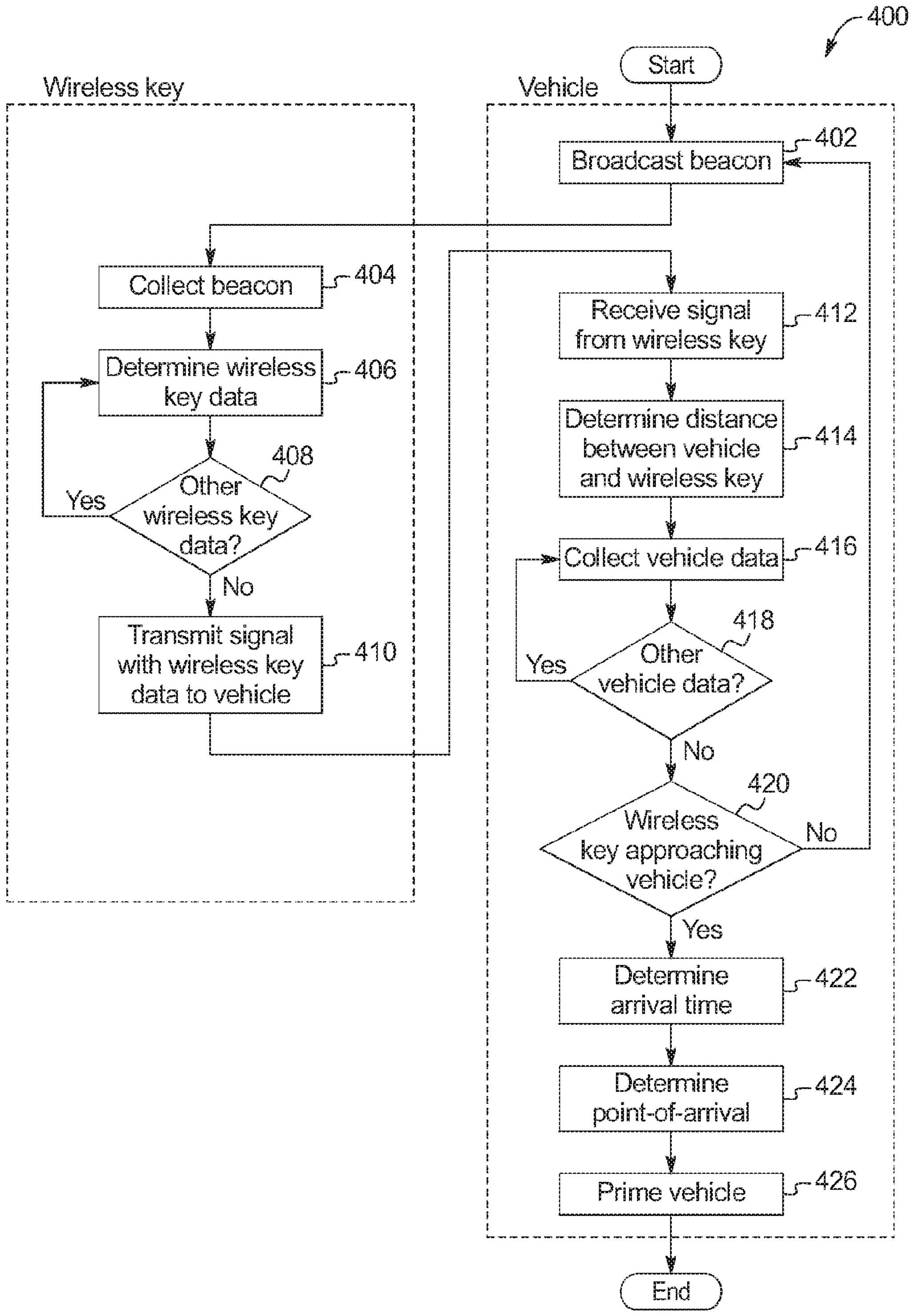
FIG. 4 is a flowchart of an example method to prime the vehicle of FIG. 1 based on a velocity of the wireless key of FIG. 1.

FIG. 4 is a flowchart of an example method 400 to prime a vehicle based on a velocity of a wireless key. The flowchart of FIG. 4 is representative of machine readable instructions that are stored in memory (such as the memory 204 of FIG. 2 and/or the memory 312 of FIG. 3) and include one or more programs which, when executed by a processor (such as the processor 202 of FIG. 2 and/or the processor 310 of FIG. 3), cause the wireless key 104 to implement the example characteristic determiner 210 of FIG. 2 and/or the vehicle 100 to implement the example vehicle primer 124 of FIGS. 1 and 3. While the example program is described with reference to the flowchart illustrated in FIG. 4, many other methods of implementing the example characteristic determiner 210 and/or the example vehicle primer 124 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the communication module 106 of the vehicle 100 broadcasts the beacon 110. At block 404, the communication module 206 of the wireless key 104 collects the beacon 110. For example, the communication module 206 collects the beacon 110 upon entering the proximity range 108 of the vehicle 100. At block 406, the characteristic determiner 210 of the wireless key 104 determines wireless key data. For example, the characteristic determiner 210 determines velocity data (e.g., a speed and a direction of travel) of the wireless key 104 based on data collected from one or more of the sensors 208 of the wireless key 104. At block 408, the characteristic determiner 210 identifies whether there is other wireless key data (e.g., orientation data) to determine. If the characteristic determiner 210 identifies that there is other data, blocks 406, 408 are repeated until no other wireless key data remains to be determined.

At block 410, the communication module 206 of the wireless key 104 generates the signal 112 to include the wireless key data and transmits the signal 112 to the communication module 106 of the vehicle 100. The communication module 106 of the vehicle 100 receives the signal 112 from the wireless key 104 at block 412. Further, at block 414, the communication module 106 of the vehicle 100 determines a distance between the vehicle 100 and the wireless key 104 based on the signal strength (e.g., the RSSI) of the signal 112.

At block 416, the vehicle primer 124 collects vehicle data from the vehicle 100. For example, the vehicle primer 124 may determine orientation data of the vehicle 100 based on data collected from the GPS receiver 114 and/or one or more of the sensors 304 of the vehicle 100. At block 418, the vehicle primer 124 identifies whether there is other vehicle data to be collected. If the vehicle primer 124 identifies that there is other vehicle data, blocks 416, 418 are repeated until no other vehicle data remains to be determined.

At block 420, the vehicle primer 124 determines whether the wireless key is approaching the vehicle 100. In response to determining that the wireless key 104 is not approaching the vehicle 100, the method 400 returns to block 402. In response to determining that the wireless key 104 is approaching the vehicle 100, the method 400 proceeds to block 422.

At block 422, the vehicle primer 124 determines the arrival time of the user 102 at the vehicle 100. For example, the vehicle primer 124 determines the arrival time based on the velocity data of the wireless key 104. In some examples, the vehicle primer 124 may compare the arrival time to a first predetermined threshold. For example, if the user 102 is moving slowly such that the user 102 will not arrive at the vehicle 100 before the first predetermined threshold (e.g., the arrival time is greater than the predetermined threshold), the method 400 returns to block 402 so that the communication module 106 of the vehicle may broadcast another beacon (block 402) and receive subsequent additional wireless key data from the wireless key 104 (block 412). Additionally or alternatively, the vehicle primer 124 may compare the arrival time to a second predetermined threshold. If the wireless key 104 is moving so quickly that the wireless key 104 is to reach the vehicle 100 before the second predetermined threshold, the method 400 may return to block 402. For example, the wireless key 104 may be determined to reach the vehicle 100 before the second predetermined threshold if the wireless key 104 is in and/or on another vehicle (e.g., a bus, a plane, a train, a motorcycle, a bicycle, etc.). In such examples, the method 400 returns to block 402 to prevent the vehicle 102 from being primed based on a wireless key located in another vehicle.

At block 424, the vehicle primer 124 determines the point-of-arrival at which the user 102 is to arrive at the vehicle 100. For example, based on the velocity data of the wireless key 104 and the orientation data of the vehicle 100, the vehicle primer 124 may determine that the user 102 is approaching one of the doors 120 (e.g., the front, driver-side door) of the vehicle 100. At block 426, the vehicle primer 124 primes the vehicle 100 for the user 102. For example, the vehicle primer 124 may unlock and/or prime one or more of the doors 120, activate the exterior lights 116 and/or the interior lights 118, etc. to prime the vehicle 100. In some examples, the vehicle primer 124 primes the vehicle 100 based on the point-of-arrival. For example, the vehicle primer 124 may unlock one of the doors 120 closest to the point-of-arrival and may keep the other of the doors 120 locked that are farther away from the point-of-arrival.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:

a communication module to:

broadcast a beacon to prompt a wireless key to send a signal;

receive the signal from the wireless key that includes velocity data of the wireless key; and adjust a broadcast rate for subsequent beacons based on the velocity data; and a vehicle primer to:

determine an arrival time of the wireless key based on the velocity data; and prime the vehicle for access before the arrival time.

2. The vehicle of claim 1, wherein the beacon broadcasted by the communication module is a low-energy beacon.

3. The vehicle of claim 1, wherein the signal includes orientation data of the wireless key and the vehicle primer determines the arrival time further based on the orientation data.

4. The vehicle of claim 1, wherein the velocity data includes a speed and a direction of travel of the wireless key.

5. The vehicle of claim 1, wherein the communication module determines a distance to the wireless key based on a signal strength of the signal and the vehicle primer determines the arrival time further based upon the distance.

6. The vehicle of claim 1, wherein, to prime the vehicle for access by a user of the wireless key, the vehicle primer activates lighting and primes a door for unlocking.

7. The vehicle of claim 1, wherein the communication module broadcasts a first of the subsequent beacons in response to the vehicle primer determining that the first of the subsequent beacons is to be broadcast before the arrival time.

8. The vehicle of claim 7, wherein the vehicle primer primes the vehicle before the communication module broadcasts the first of the subsequent beacons in response to determining that the first of the subsequent beacons is to be broadcast after the arrival time.

9. The vehicle of claim 1, wherein the vehicle primer determines a point-of-arrival at the vehicle based on the velocity data of the wireless key and an orientation of the vehicle.

10. The vehicle of claim 9, wherein, to prime the vehicle, the vehicle primer primes a door nearest to the point-of-arrival for unlocking.

11. The vehicle of claim 10, wherein, to prime the door, the vehicle primer instructs an electronic latch to unlock the door upon detection that a user of the wireless key has touched a handle of the door.

12. The vehicle of claim 9, further including a GPS receiver to determine the orientation of the vehicle.

13. A method comprising:

broadcasting, via a communication module of a vehicle, a beacon to prompt a wireless key of a user to send a signal;

receiving, via the communication module, a signal from the wireless key that includes velocity data of the wireless key;

adjusting a broadcast rate for subsequent beacons based on the velocity data; and determining, via a processor, a distance between the vehicle and the wireless key;

determining an arrival time of the user based on the velocity data and the distance; and priming the vehicle for access before the arrival time.

14. The method of claim 13, wherein determining the distance between the vehicle and the wireless key includes determining the distance based on a signal strength of the signal.

15. The method of claim 13, further including determining a point-of-arrival at the vehicle based on the velocity data of the wireless key and an orientation of the vehicle.

16. The method of claim 15, wherein priming the vehicle includes unlocking a door nearest to the point-of-arrival.

17. A system including:

a wireless key of a user to:

determine velocity data of the wireless key; and transmit the velocity data upon collecting a beacon; and a vehicle to:

broadcast the beacon to prompt the wireless key to send a signal;

receive the velocity data from the wireless key;

adjust a broadcast rate for subsequent beacons based on the velocity data; and determine an arrival time of the user based on the velocity data and a signal strength of the signal; and prime the vehicle for access before the arrival time.

18. The system of claim 17, wherein the wireless key obtains the beacon broadcasted by the vehicle when the wireless key is within a proximity range of the vehicle.

19. The system of claim 17, wherein the velocity data includes a speed of the wireless key and the wireless key includes an accelerometer that determines the speed.

20. The system of claim 17, wherein the velocity data includes a direction of travel of the wireless key and the wireless key includes a magnetometer that determines the direction of travel.

* * * * *